Sept. 6, 1949.  E. R. OLSEN ET AL  2,481,335
BORING FIXTURE FOR MACHINE TOOLS
Filed Sept. 13, 1946  2 Sheets-Sheet 1
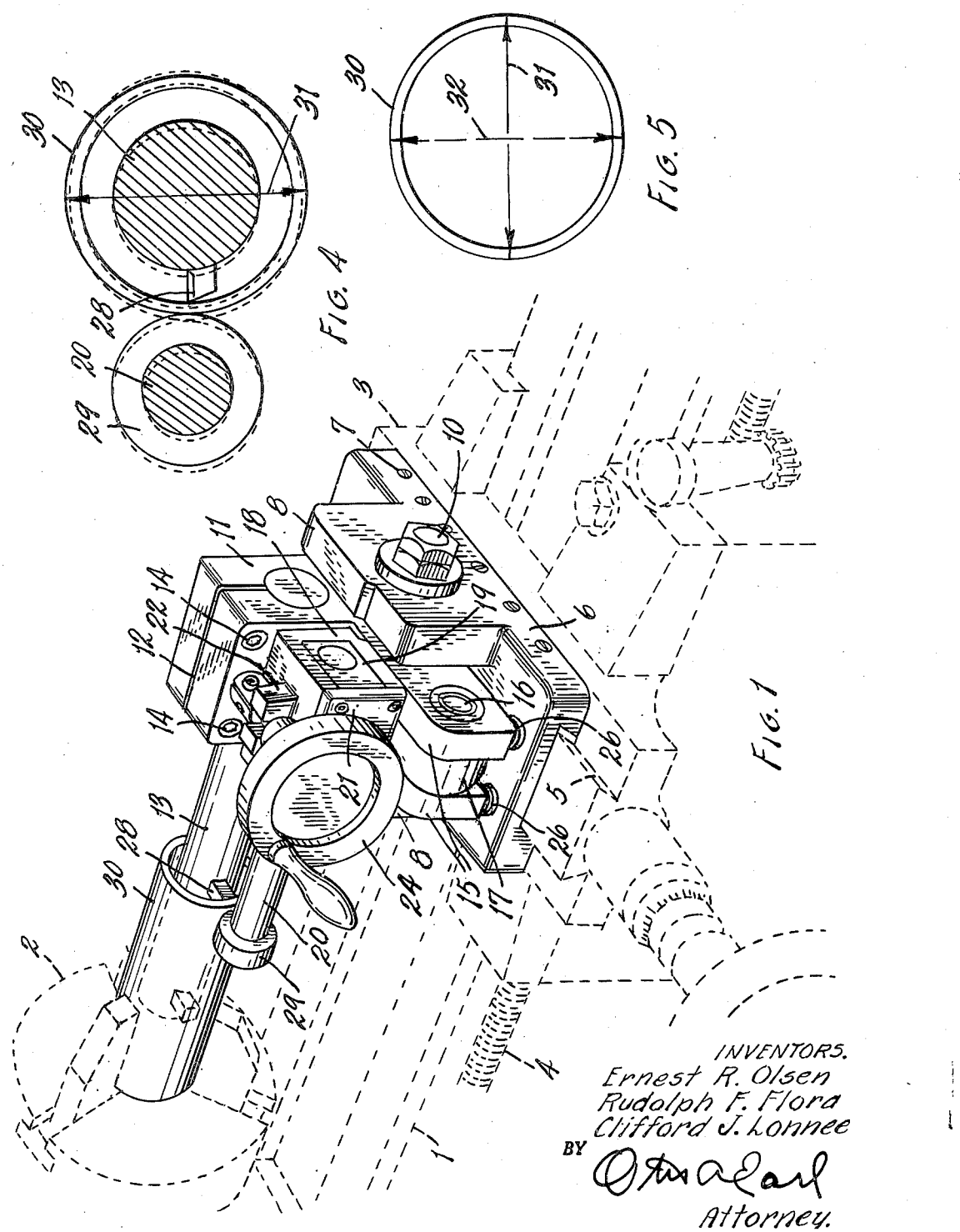
INVENTORS.
Ernest R. Olsen
Rudolph F. Flora
Clifford J. Lonnee
BY
Otis A. Earl
Attorney.

Sept. 6, 1949.                  E. R. OLSEN ET AL                     2,481,335
                        BORING FIXTURE FOR MACHINE TOOLS
Filed Sept. 13, 1946                                              2 Sheets-Sheet 2
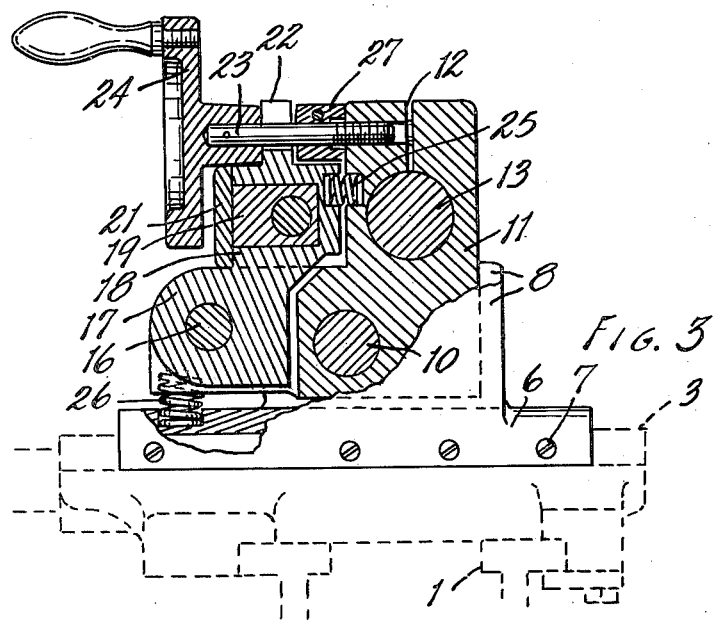
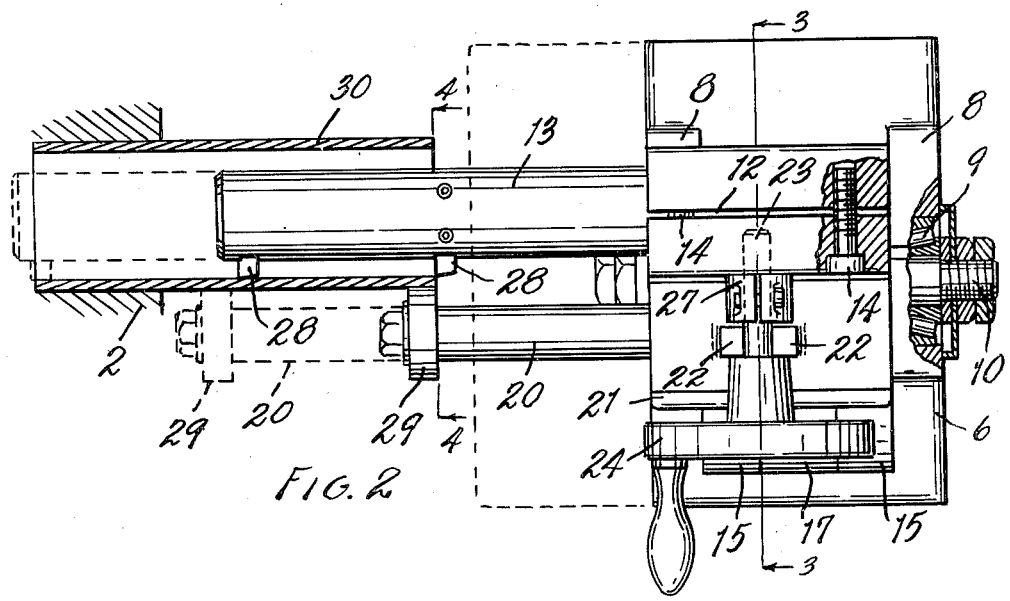
INVENTORS.
Ernest R. Olsen
Rudolph F. Flora
Clifford J. Lonnee
BY
Attorney.

Patented Sept. 6, 1949

2,481,335

UNITED STATES PATENT OFFICE 2,481,335

BORING FIXTURE FOR MACHINE TOOLS

Ernest R. Olsen, Rudolph F. Flora, and Clifford J. Lonnee, Muskegon, Mich., assignors to Hastings Manufacturing Company, Hastings, Mich.

Application September 13, 1946, Serial No. 696,878

13 Claims. (Cl. 77—61)

This invention relates to improvements in boring fixtures for machine tools.

The principal objects of this invention are:

First, to provide a fixture for a lathe for finishing the insides of centrifugally cast tubular castings from which piston rings are to be cut, which castings have an out-of-round outside diameter and a substantially round inside diameter to provide an out-of-round tube of uniform wall thickness throughout.

Second, to provide a fixture for a lathe by means of which the inside of tubes having a slightly out-of-round or ellipsoidal outside diameter may be finished to a uniform wall thickness.

Third, to provide a boring fixture for use with an ordinary lathe or other machine tool to bore out the interior of irregular shaped tubular stock so that the inner surface will be parallel to the outer surface.

Other objects relating to details and economies of the invention will appear from the description to follow. The invention is defined and pointed out in the claims.

The drawings, of which there are two sheets, illustrate a preferred form of the invention.

Fig. 1 is a perspective view of the boring fixture, the lathe with which it is associated being shown in dotted lines.

Fig. 2 is a plan view partially broken away of the boring fixture in partially adjusted position, the cutting tools being axially adjusted but not radially adjusted to commence the boring operation on work which is shown in cross-section.

Fig. 3 is a cross-sectional view taken along the line 3—3 in Fig. 2.

Fig. 4 is a cross-sectional view taken along the line 4—4 in Fig. 2.

Fig. 5 is an end view of the finished sleeve which the boring fixture is arranged to produce.

In the drawings the reference character 1 indicates the bed of a lathe which is provided with a standard head stock and chuck 2 and a movable carriage 3 arranged to be automatically fed toward the work by the screw members 4. The carriage 3 is provided with a dove-tail flange 5 on which is mounted the base 6 of the boring fixture. The base is adjustably secured to the dove-tailed flange by means of gibs held in place by the screws 7, the parts of the lathe per se not being a part of the invention are shown only in dotted lines.

The base 6 is provided with spaced upstanding ears 8 which are apertured to receive the roller bearings 9 for rotatably supporting a shaft 10 in parallel relationship to the axis of the chuck. The shaft 10 extends through and supports the boring bar holder 11 for rocking movement relative to the base 6. The upper portion of the boring bar holder is vertically slotted as at 12 and apertured to receive the end of the boring bar 13 in parallel relationship to the shaft 10. Screws 14 are arranged to clamp the slotted holder tightly around the boring bar.

The holder 11 is provided with forwardly extending transversely spaced ears 15 along its lower edge which are pierced to rotatably support a shaft 16 parallel to the shaft 10. The shaft is non-rotatably secured to the tongue 17 formed on the under side of the follower bar holder 18. The follower bar holder is formed with a forwardly opening slot arranged to receive the block 19 secured to the end of the follower bar 20. The block and bar are retained in place in the follower bar holder with the follower bar parallel to the shaft 10 by means of a plate 21 bolted to the face of the holder. Spaced ears 22 formed on the top of the follower bar holder are arranged to pass the stud bolt 23, the rear end of which is threaded in the upper portion of the boring bar holder and the forward end of which is secured to the hand wheel 24.

The opposed faces of the boring bar holder and the body of the follower bar holder are recessed to receive the coil spring 25 which constantly urges the follower bar holder and the boring bar holder apart and presses the ears 22 against the hub of the hand wheel 24. A pair of coil springs 26 are positioned between the base 6 and the bottom of the ears 15 on the boring bar holder forwardly of the shaft 16. The springs 26 therefor act to rotatably urge the boring bar holder rearwardly and to carry the follower bar holder with it since the follower holder is mounted on the shaft 16. The boring bar holder may be rocked backwardly until its rear edge strikes the base 6. A split spacer sleeve 27 is positioned around the stud 23 between the ears on the follower bar holder and the forward face of the boring bar holder to limit the distance through which the hand wheel 24 may force the follower bar holder toward the boring bar holder against the action of spring 25.

The boring bar 13 is provided with a pair of cutting tools 28, one of which is positioned near the free end of the bar and the second of which is spaced midway between the first cutting tool and the side face of the holder 11. The follower bar holder 20 has a roller bearing 29 mounted on its free end and opposite the second or intermediate cutting tool 28.

The fixture is so designed that by counterclockwise rotation of the hand wheel 24 the clamping action of the wheel and the bolt between the boring bar and follower bar holders will be relaxed permitting the spring 25 to rotate the follower bar holder on the shaft 16 relative to the boring bar, thus moving the follower bar 20 and bearing 29 away from the cutting tools 28. The entire fixture may then be adjusted axially with the boring bar in the interior of a sleeve 30 as indicated in Fig. 2 and with the intermediate cutting tool 28 adjacent to the free end of the sleeve 30. The hand wheel 24 may then be rotated in a clockwise direction to draw the follower bar holder against the boring bar holder and compress the spring 25 until the ears 22 contact the spacer sleeve 27. This draws the cutting tools 28 and bearing 29 together on opposite sides of the sleeve wall to apply the necessary cutting pressure to the cutting tools. The spring 26 will then act to cause the roller 29 to follow the contour of the work and the cutting tool being fixed relative to the roller will be forced to follow. When the lathe is started for automatic feed, the forward cutting tool 28 will bore out the work to its fixed end while the intermediate cutting tool will bore out the free end of the work to where the first cutter started.

The fixture is specifically designed to operate on centrifugally cast sleeves having a cross-section such as shown in Fig. 4 which has a cylindrical inside diameter but which is slightly out-of-round or ellipsoidal, having a longer outside major diameter 31 than outside minor diameter 32. The dotted lines show the position assumed by the parts when rotated 90 degrees and also indicate the increased depth of cut that will be made by the tool at the ends of the major axis.

Work of this character is particularly found in the manufacture of automotive piston rings in which a casting of the general desired contour is formed and then cut into rings. As the chuck 2 rotates the sleeve 30 and brings the major diameter into contact with the follower bar bearing 29, the follower bar will tend to move toward the front of the lathe as shown by the dotted lines in Fig. 4. Since the follower bar and holder are tightly clamped to the boring bar holder by the hand wheel 24, the boring bar holder must move with the follower bar by rotating on the shaft 10 against the compression of the spring 26. As the minor diameter or flattened side of the sleeve approaches the follower bar the pressure of the spring 26 will reverse the movement of the follower bar and boring bar. Thus the cutting tools 28 will follow the eccentricity of the outside diameter of the work to maintain a constant wall thickness completely around the work. When the cut is finished and the clamping action of the hand wheel is released, the spring 25 will force the cutting tools away from the follower bearing which still engages the outside of the work so that the fixture may be backed off without scoring the work.

Spacer sleeves 27 of different lengths may be used to give different wall thicknesses of the sleeve 30. The spacer acts as a production gauge for turning out a series of sleeves of equal wall thickness without re-setting the cutting tools or measuring the distance between the follower bar bearing and cutting tools when each new sleeve is put in the lathe.

It will be appreciated by those skilled in the art that the same principles of operation would be obtained if the work piece were held stationary and the boring fixture were mounted on a rotatable head such as may be found on some boring machines and drill presses.

The invention has been shown in an embodiment thereof which has been found to be highly satisfactory. No attempt has been made to show other possible adaptations, as it is believed that this disclosure will enable those skilled in the art to adapt the invention as may be desired.

Having thus described our invention, what we claim as new and desire to secure by Letters Patent is:

1. In combination with a lathe having a movable carriage, a boring fixture comprising a base adjustably secured to said carriage, upstanding ears on said base, a first shaft journaled in said ears, a boring bar holder mounted on said first shaft and rockable thereon relative to said base, forwardly extending ears formed on said boring bar holder, a second shaft journaled in said forwardly extending ears and parallel to the said first shaft, a follower bar holder secured to said second shaft rockable thereon relative to said boring bar holder, a hand wheel threadedly connected with said boring bar holder and engageable with said follower bar holder to clamp said holders together, a spacer member removably positioned between said boring and follower holders to limit the action of said hand wheel, spring means positioned between said holder members to resist clamping action of said hand wheel, spring means positioned between said base and said boring bar holder and on the opposite side of said second shaft from said first shaft, a boring bar mounted in said boring bar holder parallel to said shafts and having a pair of longitudinally spaced cutting tools secured thereon, and a follower bar mounted in said follower bar holder parallel to said shafts and having a bearing rotatably mounted on the free end thereof in spaced relationship with the inner of said cutting tools.

2. In combination with a lathe having a movable carriage, a boring fixture comprising a base adjustably secured to said carriage, a first shaft journaled on said base, a boring bar holder mounted on said first shaft and rockable thereon relative to said base, a second shaft journaled on said boring bar holder, a follower bar holder secured to said second shaft and rockable thereon relative to said boring bar holder, a hand wheel threadedly connected with said boring bar holder and engageable with said follower bar holder to clamp said holders together, spring means positioned between said holders to resist clamping action of said hand wheel, other spring means positioned between said base and said boring bar holder arranged to urge said boring bar holder carrying said follower bar holder to rotate about said first shaft, a boring bar mounted in said boring bar holder and having a pair of cutting tools secured thereon and a follower bar mounted in said follower bar holder and having a bearing journaled on the free end thereof adjacent to the inner of said cutting tools.

3. In combination with a lathe having a movable carriage, a boring fixture comprising a base secured to said carriage, a boring bar holder mounted on and rockable relative to said base about an axis parallel to the axis of rotation of said lathe, a follower bar holder secured to said boring bar holder and rockable about an axis parallel to the axis of rotation of said lathe, screw means threadedly connected between said boring bar holder and said follower bar holder to clamp said holders together, spring means positioned between said holders to resist action of said screw means, other spring means positioned between said base and said boring bar holder, a boring bar mounted in said boring bar holder and having a pair of longitudinally spaced cutting tools secured thereon and a follower bar mounted in said follower bar holder and having a roller bearing mounted on the free end thereof adjacent to the inner of said cutting tools.

4. In combination with a lathe having a movable carriage, a boring fixture adapted to finish tubular stock having an irregular cross-section comprising, a base member secured to said carriage, a boring bar holder mounted on said base and arranged to rock about an axis parallel to the axis of rotation of said lathe, a boring bar mounted on said holder and arranged to travel into said tubular stock on movement of said carriage, a cutting tool mounted on said bar, spring means operable between said base and said holder to urge said bar and tool away from said stock, a follower member carried by said holder and engageable with the outside of said stock to overcome said spring means, and screw means connected between said follower member and said holder to adjust the distance between said follower and tool.

5. In combination with a lathe having a movable carriage, a boring fixture adapted to finish tubular stock having an irregular cross-section comprising, a base member secured to said carriage, a boring bar holder mounted on said base and arranged to rock about an axis parallel to the axis of rotation of said lathe, a boring bar mounted on said holder and arranged to travel into said tubular stock on movement of said carriage, a cutting tool mounted on said bar, spring means operable between said base and said holder to urge said bar and tool away from said stock, a follower member carried by said holder and engageable with the outside of said stock, and screw means connected between said follower member and holder to adjust the distance between said follower and tool and cause said holder to overcome the action of said spring.

6. A boring fixture for a machine tool having a chuck and a movable carriage comprising a base member adapted for attachment to said carriage, a tool holder pivotally mounted on said base member on an axis parallel to the axis of said chuck, a boring bar mounted on said holder in substantially spaced relation to its pivot and parallel thereto, a cutter on said boring bar, a follower support pivotally mounted on said tool holder on an axis parallel to the pivot of the tool holder, yielding means interposed between said tool holder and the said follower support, an adjustable step means for said follower support opposing said yielding means, a follower carried by said follower support and adapted to engage the outer side of the work, and a spring acting on said follower support to urge the follower into engagement with the work.

7. A boring fixture for a machine tool having a chuck and tool carrying member comprising a base member adapted for attachment to said tool carrying member, a tool holder pivotally mounted on said base member on an axis parallel to the axis of said chuck, a boring bar carried on said holder in substantially spaced relation to its pivotal axis and parallel thereto, a cutter on said boring bar, a follower support pivotally mounted on said tool holder, a follower carried by said follower support and adapted to engage the outer side of the work, yielding means acting on said tool holder to urge the follower into engagement with the work, and screw means operatively engaged with said tool holder and follower support to force said cutter and follower toward each other.

8. A lathe fixture comprising, a base member adapted for mounting on a lathe carriage, a tool holder pivotally mounted on said base member on an axis parallel to the axis of rotation of the work, an internal cutter mounted on said tool holder in spaced parallel relation to the pivot axis of the holder, a follower support pivotally mounted on the tool holder on an axis parallel to the axis of the tool holder, a follower mounted on said follower holder in spaced relation to its axis and adapted to coact with the work in opposition to the tool, spring means interposed between said tool holder and follower support to normally urge them from each other, an adjustable stop member limiting the outward movement of said follower support, and a spring acting on said tool holder to urge the follower carried thereby against the work.

9. A lathe fixture comprising a base member adapted for mounting on a lathe carriage, a tool holder pivotally mounted on said base member on an axis parallel to the axis of rotation of the work, an internal cutter mounted on said tool holder in spaced parallel relation to the pivot axis of the holder, a follower support pivotally mounted on the tool holder on an axis parallel to the axis of the tool holder, a follower mounted on said follower support in spaced relation to its axis and adapted to coact with the work in opposition to the tool, a spring acting on said tool holder to urge the follower carried thereby against the work, and screw means operatively engaged with said tool holder and follower support to force said cutter and follower toward each other.

10. A lathe fixture comprising a base member adapted for mounting on a lathe carriage, a tool holder swingably mounted on said base member on an axis parallel to the axis of rotation of the work, a cutter mounted on said tool holder in spaced parallel relation to the pivot axis of the holder, a follower support swingably mounted on the tool holder on an axis parallel to the axis of the tool holder, a follower mounted on said follower holder in spaced relation to its axis and adapted to coact with the work in opposition to the tool, yielding means interposed between said tool holder and follower support to normally urge them from each other, an adjustable stop member limiting the outward movement of said follower support, and springs acting on said tool holder to yieldingly urge the follower carried thereby against the work.

11. A lathe fixture comprising a base member adapted for mounting on a lathe carriage, a tool holder swingably mounted on said base member on an axis parallel to the axis of rotation of the work, a cutter mounted on said tool holder in spaced relation to the pivot axis of the holder, a follower support swingably mounted on the tool holder on an axis parallel to the axis of the tool holder, a follower mounted on said follower support in spaced relation to its swinging axis and adapted to coact with the work in opposition to the tool, means acting on said follower support to yieldingly urge the follower carried thereby against the work, and screw means operatively engaged with said tool holder and follower support to force said cutter and follower toward each other.

12. A boring fixture for a machine tool having relatively rotatable and axially movable work holding and tool holding members comprising a base adapted to be mounted on one of said members, a tool holder pivotally mounted on said base along an axis parallel to the axis of rotation of said machine, an internal cutter mounted on said tool holder in spaced parallel relationship to the pivot axis of said holder, a follower support pivotally mounted on said tool holder in spaced parallel relationship to said cutter and the pivot axis of said tool holder, a follower rotatably mounted on said follower holder in spaced parallel relationship to the pivot axis of said follower holder and arranged to coact with the work in opposition to said cutter, a spring acting on said tool holder to urge the follower carried thereby against the work, and screw means operatively engaged with said tool holder and follower support to force said cutter and follower toward each other.

13. A boring fixture for a machine tool having relatively rotatable and axially movable work holding and tool holding members comprising a base adapted to be mounted on one of said members, a tool holder pivotally mounted on said base along an axis parallel to the axis of rotation of said machine, an internal cutter mounted on said tool holder in spaced parallel relationship to the pivot axis of said holder, a follower pivotally mounted on said tool holder in spaced parallel relationship to said cutter and the pivot axis of said tool holder and arranged to coact with the work in opposition to said cutter, a spring acting on said follower to urge the follower against the work, and means operatively engaged with said tool holder and follower to force said cutter and follower toward each other.

ERNEST R. OLSEN.
RUDOLPH F. FLORA.
CLIFFORD J. LONNEE.

REFERENCES CITED

The following references are of record in the file of this patent:

UNITED STATES PATENTS

| Number | Name | Date |
|---|---|---|
| 605,504 | Muncaster | June 14, 1898 |
| 2,328,359 | Ramsdell | Aug. 31, 1943 |